United States Patent [19]

Wicnienski et al.

[11] 4,426,612
[45] Jan. 17, 1984

[54] BATTERY CHARGING AND TESTING CIRCUIT

[75] Inventors: Michael F. Wicnienski, Antioch; Donald E. Charles, Lake Zurick, both of Ill.

[73] Assignee: Baxter Travenol Laboratories, Inc., Deerfield, Ill.

[21] Appl. No.: 369,038

[22] Filed: Apr. 16, 1982

[51] Int. Cl.³ .............................................. H02J 7/10
[52] U.S. Cl. ...................................... 320/39; 320/35; 320/48
[58] Field of Search ....................... 320/35, 36, 39, 40, 320/48

[56] References Cited

U.S. PATENT DOCUMENTS

| | | |
|---|---|---|
| 3,193,750 | 7/1965 | Chait . |
| 3,307,101 | 2/1967 | Byles . |
| 3,358,217 | 12/1967 | Deelman . |
| 3,510,750 | 5/1970 | Horino et al. . |
| 3,553,561 | 1/1971 | Lesher . |
| 3,600,661 | 8/1971 | Briggs et al. ........................ 320/35 |
| 3,736,489 | 5/1973 | Mullersman ........................ 320/39 |
| 3,787,754 | 1/1974 | Seabase ........................ 320/43 |
| 3,919,618 | 11/1975 | Coleman et al. ........................ 320/39 |
| 4,105,962 | 8/1978 | Scott, Jr. et al. ........................ 320/32 |
| 4,146,830 | 3/1979 | Foster ........................ 320/39 |
| 4,153,867 | 5/1979 | Jungfer ........................ 320/43 |
| 4,209,736 | 6/1980 | Reidenbach ........................ 320/22 |
| 4,229,688 | 10/1980 | Knox et al. ........................ 320/48 |
| 4,327,317 | 4/1982 | Heine et al. ........................ 320/48 |

Primary Examiner—William M. Shoop
Assistant Examiner—Anita M. Ault
Attorney, Agent, or Firm—Garrettson Ellis; Paul C. Flattery; George H. Gerstman

[57] ABSTRACT

A constant current battery charging circuit is provided by which the battery receives a full charge until the battery voltage reaches a threshold. When the battery voltage is above the threshold, the battery receives a trickle charge. The actual battery voltage is compared with a reference voltage to determine whether the full charge circuit should be in operation. Hysteresis is provided for preventing a rapid on/off operation around the threshold. The reference voltage is compensated for temperature variations. The hysteresis system and temperature compensation system are independent of each other. A separate test circuit is provided for testing the battery voltage. During testing of the battery, the full charge circuit is inoperative.

24 Claims, 1 Drawing Figure

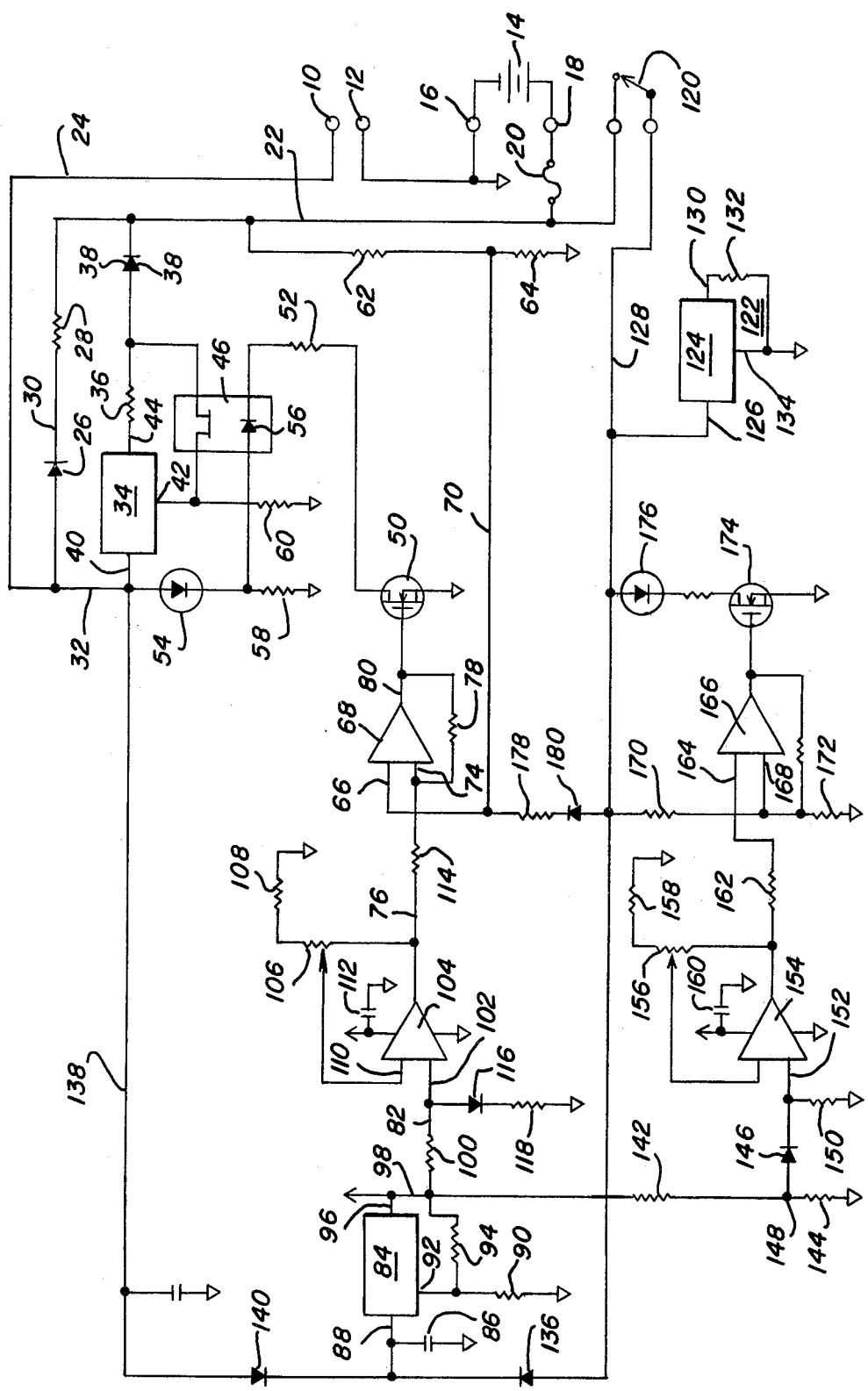

BATTERY CHARGING AND TESTING CIRCUIT

TECHNICAL FIELD

The present invention concerns a novel battery charging and testing circuit, and more particularly, a battery charging circuit which provides a constant current charge to a battery, with a circuit for testing the state of the battery condition.

BACKGROUND ART

Various portable systems for medical use are known which employ a battery for providing power for the system. For example, a battery may be used to power an ultraviolet light source for sterilization purposes. For such usage, it is essential that the battery be capable of delivering sufficient energy for the sterilization cycle.

We have discovered a circuit for providing an effective system whereby the battery may be properly maintained for delivering sufficient energy in medical environments. To this end, a battery charger which provides a constant current charge to the battery is utilized in contrast to a constant voltage charger. A constant current charge is provided to the battery until the battery voltage reaches a threshold and, when the battery voltage is above the threshold a trickle charge having a much lower amount of current is applied to the battery. The trickle charge is sufficient to complete the charge to the battery and to compensate for the self-discharge of the battery.

Battery chargers are known in the prior art for providing a constant current charge to the battery until the battery voltage reaches a threshold, and for providing a trickle charge thereafter. In Coleman, et al. U.S. Pat. No. 3,919,618, this basic type of battery charging is disclosed. However, Coleman, et al. discloses the use of a voltage reference element diode for providing temperature compensation and also for developing a hysteresis loop. The Coleman, et al. circuit is such that in the high rate charging mode there is less current passed through the voltage reference element diode than in the low rate charging mode. This is essential to the Coleman, et al. method for developing the hysteresis loop. An undesirable side effect of this is that the temperature coefficient exhibited by this voltage reference element diode varies with the change in current. Thus the temperature compensation provided by the Coleman, et al. circuit is compromised.

For certain medical uses the accuracy and efficiency of a battery charger cannot be compromised. We have discovered a constant current type battery charger in which there is no compromising of the temperature compensation in order to provide hysteresis. In the illustrative embodiment of our invention, the temperature compensation is independent of whether the charging is in the high rate mode or the low rate mode. In addition, in the illustrative embodiment of our invention the mechanism which introdudes hysteresis into the voltage reference is also independent from temperature effects.

In addition, we have discovered that in medical usage it is appropriate that the state of the battery condition be checked. To this end, in the illustrative embodiment of our invention a circuit is provided for testing the state of the battery condition.

DISCLOSURE OF THE INVENTION

In accordance with the present invention, a battery charging circuit is provided which comprises an input voltage source, a trickle charge circuit coupled between the input voltage source and the battery to be charged, and a full charge circuit coupled between the input voltage source and the battery to be charged. The full charge circuit includes means for providing a constant current.

The voltage of the battery is sensed, and the sensed battery voltage is compared with a reference voltage. The constant current providing means is controlled in response to the comparison of the sensed battery voltage and the reference voltage. When the battery voltage is above a threshold, the full charge circuit becomes inoperative and the trickle charge circuit becomes operative.

In the illustrative embodiment, temperature compensation means are provided for varying the reference voltage in response to temperature variations. The comparing means include means for providing hysteresis for preventing rapid on/off operation of the operating means around the threshold. The temperature compensation means and the hysteresis providing means are independent of each other.

In the illustrative embodiment, a separate test circuit is provided having means for comparing a reference voltage with the sensed battery voltage and means for indicating a selected battery condition in response to the comparison of the reference voltage and the sensed battery voltage.

In the illustrative embodiment, the comparing means comprises an operational amplifier. By utilizing an operational amplifier, a system is provided in which (a) temperature compensation is independent of whether the system is in the full charging mode or the trickle charging mode, and (b) the system for introducing hysteresis into the voltage reference is independent from temperature effects.

In the illustrative embodiment, the constant current providing means comprises a three terminal adjustable voltage regulator with a resistor at its output. The trickle charge circuit comprises a diode and a resistor. The battery voltage sensing means comprises a voltage divider coupled to an input terminal of an operational amplifier, with a reference voltage providing means being coupled to the other input terminal of the operational amplifier.

In the illustrative embodiment, the temperature compensation means comprises a diode having a negative temperature coefficient coupled to the means for providing the reference voltage. In this manner, the reference voltage will decrease in response to increasing temperature.

A more detailed explanation of the invention is provided in the following description and claims, and is illustrated in the accompanying drawing.

BRIEF DESCRIPTION OF DRAWING

The FIGURE is a schematic circuit diagram of a battery charging and testing circuit constructed in accordance with the principles of the present invention.

DETAILED DESCRIPTION OF THE ILLUSTRATIVE EMBODIMENT

In the illustrative embodiment, the battery to be charged is a 12 volt, 2,5 amp-hour battery. The battery is charged at a full charging rate of 250 milliamps until the battery reaches a threshold voltage of 14 volts to 15 volts (depending upon temperature). At this point, the charging rate decreases to a trickle charge of 5 milliamps. The battery is charged with the trickle charge to a fully charged state, with the 5 milliamps being sufficient to give the battery a charge and to compensate for the self-discharge of approximately 1 milliamp or less.

Referring to the drawing, an input voltage source is connected between input terminals 10, 12, with the input voltage source preferably being in the form of a rectified DC voltage. A battery 14 is connected between terminals 16 and 18, with terminals 12 and 16 being common to ground and terminal 18 being connected to the positive side of the battery and through fuse 20 to positive line 22.

The positive side of the input source is connected to terminal 10 which is connected via line 24 to a trickle charging circuit comprising diode 26 and resistor 28 in series with line 30. Thus the trickle charge line to the battery comprises line 24, line 30 (with diode 26 and resistor 28), line 22 and fuse 20 to terminal 18.

The full charge circuit comprises line 24, line 32, three-terminal adjustable voltage regulator 34, resistor 36, diode 38, line 22 and fuse 20 to terminal 18. Although no limitation is intended, three-terminal adjustable voltage regulator 26 could comprise a National Semiconductor LM 317T integrated circuit three-terminal adjustable regulator, having an input terminal 40, an adjustment terminal 42, and an output terminal 44.

A photo-FET 46 is interposed between adjustable voltage terminal 42 and the output side of resistor 36. By having a series resistor 36 at the output of regulator 34, a constant current is provided in line 22. FET 46 operates to reduce the compliance of this constant current source to the battery 14 to the point where the constant current source can no longer deliver the constant current to the battery. In other words, in the normal full charging mode, the FET 46 effectively acts to short the circuit between adjustable voltage terminal 42 and the output of resistor 36. However, when the charge of the battery is such that the voltage reaches the threshold amount, the infrared LED within photo-FET 46 will turn off, and the internal FET will act as an open circuit. Since adjustment terminal 42 is returned to ground via resistor 60, the compliance of regulator 34 is reduced to a point wherein diode 38 no longer conducts. Thereafter, the trickle charge will be operative.

Thus photo-FET 46 acts as a switch to control the operation of the constant current source. Photo-FET 46, however, is operated in response to a second switch 50, in the form of an MOS FET. When the battery voltage reaches the threshold amount, switch 50 will turn off, effectively turning off the internal infrared LED within photo FET 46. The output of switch 50 is coupled through resistor 52 to the internal infrared LED in photo-FET 46.

An LED 54 is connected between input terminal 40 and the anode of infrared LED 56. The cathode of LED 54 is connected to ground through resistor 58. LED 54 operates as an indicator which glows brightly during the normal, full charge, but reverts to a much lower brightness level during the trickle charge.

The voltage on battery 14 is sensed as follows. A voltage divider comprising resistors 62 and 64 are such that they divide the voltage by three and the result is applied to terminal 66 of an operational amplifier 68 via lines 70 and 72. A reference voltage is applied to terminal 74 of operational amplifier 68 via line 76. When the voltage on line 66 exceeds the voltage on line 76, switch 50 shuts off to turn off infrared LED 56 and to begin the trickle charge operation. Thus operational amplifier 68 operates to compare the sensed battery voltage (at terminal 66) with a reference voltage (at terminal 74). A resistor 78 connected between terminal 74 and output line 80 of the operational amplifier 68 provides hysteresis for amplifier 68. Without resistor 78, once the threshold voltage was achieved, only a small voltage swing would be required for the operational amplifier to go high and low. Thus the circuit would go up and down with respect to the threshold voltage at a very rapid rate.

The reference voltage which is supplied to terminal 74 is carefully controlled. To this end, a carefully controlled constant current is supplied via line 82. This current is supplied by means of an internal supply regulator including a three-terminal integrated circuit adjustment voltage regulator 84. A bypass capacitor 86 is connected between the input terminal 88 and ground and a resistor 90 is connected between the voltage adjusting terminal 92 and ground. A resistor 94 is connected between the voltage adjusting terminal 92 and the output terminal 96, with the output junction 98 being coupled through resistor 100 to terminal 102 of an operational amplifier 104, configured as a voltage multiplier. A potentiometer 106 and resistor 108 are connected to terminal 110 of the operational amplifier 104 in order to determine the voltage multiplication provided by the operational amplifier 104. Capacitor 112 is provided to bypass the DC supply of operational amplifiers 104 and 68. The multiplied reference voltage on line 76 is fed through resistor 114 to terminal 74 of operational amplifier 68.

As the battery temperature increases, the voltage required to charge the battery to full capacity is less. Thus the threshold voltage varies according to temperature. For example, at 0° F. the threshold voltage may be 15 volts, while at 100° F. the threshold voltage may be 14 volts. A temperature compensation circuit is provided to change the threshold at which the battery charger changes from the full charge to the trickle charge. The temperature compensation circuit includes a silicon diode 116 that has a negative temperature coefficient of approximately −2 millivolts per °C. Diode 116 is coupled to ground through resistor 118. As a result of the temperature characteristic of diode 116, on line 82 there is a small temperature compensated voltage which is multiplied by amplifier 104 to a level that applies the desired voltage to terminal 74 of operational amplifier 68. Thus at 100° F. the voltage at terminal 74 may be 4.6 volts, while at 0° F. the voltage at terminal 74 may be 5 volts. Likewise, the voltage at terminal 66 of operational amplifier 68 will vary naturally in accordance with temperature because the coltage at terminal 66 is a division of the actual battery voltage which varies with temperature.

A test circuit is provided for determining the state of charge of the battery. When the battery is to be tested, a switch 120 is closed, which places a current sink 122 across the battery. Current sink 122 comprises a three-terminal integrated circuit voltage regulator 124 with its input terminal 126 connected via line 128 and switch 120 to the positive terminal of battery 14 and with its output terminal 130 connected through resistor 132 to ground. Resistor 132 is connected between output terminal 130 and the voltage adjusting terminal 134 of regulator 124.

When the constant current sink is placed across the battery, current to regulator 84 is supplied from the battery itself via fuse 20, switch 120, line 128 and diode 136 if the input supply is not connected to terminals 10 and 12. However, if the input supply is connected to terminals 10 and 12, current is supplied to voltage regulator 84 through line 24, line 32, line 138 and diode 140.

A voltage divider comprising resistor 142, connected to junction 98, and resistor 144 is provided with a diode 146 connected to junction 148 between resistors 142 and 144. The cathode of diode 146 is connected to ground through resistor 150 and is directly connected to terminal 152 of amplifier 154. Potentiometer 156 and resistor 158 determine the voltage multiplication provided by amplifier 154; capacitor 160 is the power supply bypass for operational amplifiers 154 and 166 to avoid oscillations. The output of amplifier 154 is connected through resistor 162 to voltage reference input terminal 164 of operational amplifier 166. Input terminal 168 of operational amplifier 166 is provided with a voltage corresponding to a division of the actual battery voltage. This division is provided by a voltage divider comprising resistor 170 and resistor 172.

Resistors 142, 144, 150 and silicon diode 146 form a temperature compensated reference voltage generator which provides a voltage to terminal 152 of amplifier 154. The voltage at input terminal 164 of operational amplifier 166 sets the threshold for testing the battery. If the voltage at terminal 168 is greater than the reference voltage at terminal 164, the output of operational amplifier 166 is high to turn on MOS FET 174 and thus LED 176 will give an indication that the battery is in good shape by emitting a strong light. Thus during the test, if LED 76 is on, that means that the battery is above the test threshold and that the battery has enough capacity to complete the desired job.

A resistor 178 is connected to line 70 and a diode 180 is connected between resistor 178 and line 128. Resistor 178 and diode 180 is provided for the reason that during test, it is desired that the charger be at its trickle rate condition. Thus when switch 120 is closed for the test, input terminal 66 of operational amplifier 68 perceives a voltage as a result of resistor 178 and diode which looks high enough to look like the battery has reached its threshold voltage, and thus the trickle charge will be in operation.

Although illustrative embodiments of the invention have been shown and described, it is to be understood that various modifications and substitutions may be made by those skilled in the art without departing from the novel spirit and scope of the present invention.

That which is claimed is:

1. A constant current battery charging circuit, which comprises:
    an input voltage source;
    a trickle charge circuit coupled between said input voltage source and a battery to be charged;
    a full charge circuit coupled between said input voltage source and the battery to be charged;
    said full charge circuit including means for providing a constant current;
    means for controlling said constant current means;
    means for sensing the voltage of the battery;
    means for providing a reference voltage;
    an operational amplifier for comparing the sensed battery voltage with the reference voltage;
    means for operating said controlling means in response to said operational amplifier, whereby said full charge circuit will be inoperative and said trickle charge circuit will be operative when the battery voltage is above a threshold;
    means for testing the battery condition including a separate test circuit having means for providing a reference voltage, means for sensing the battery voltage, means for comparing the sensed battery voltage with the reference voltage, and means for indicating a selected battery condition in response to said comparing means.

2. A constant current battery charging circuit which comprises:
    an input voltage source;
    a trickle charge circuit coupled between said input voltage source and a battery to be charged;
    a full charge circuit coupled between said input voltage source and the battery to be charged;
    said full charge circuit including means for providing a constant current;
    means for controlling said constant current means;
    means for sensing the voltage of said battery;
    means for providing a reference voltage;
    means for comparing the sensed battery voltage with the reference voltage;
    temperature compensation means for varying the reference voltage in response to temperature variations;
    means for operating said controlling means in response to said comparing means, whereby said full charge circuit will be inoperative and said trickle charge circuit will be operative when the battery voltage is above the threshold;
    said comparing means including means for providing hysteresis for preventing rapid on/off operation of said operating means around a threshold;
    means for testing the battery condition including a separate test circuit having means for providing a reference voltage, means for sensing the battery voltage, means for comparing the sensed battery voltage with the reference voltage, and means for indicating a selected battery condition in response to said last-mentioned comparing means.

3. A circuit as described in claim 1, said hysteresis providing means comprising a resistance interposed between the reference input terminal of the operational amplifier and the output of the operational; amplifier.

4. A constant current battery charging circuit, which comprises:
    an input voltage source;
    a trickle charge circuit coupled between said input voltage source and a battery to be charged;
    a full charge circuit coupled between said input voltage source and the battery to be charged;
    said full charge circuit including means for providing a constant current;
    means for controlling said constant current means;
    means for sensing the voltage of the battery;
    means for providing a reference voltage;
    an operational amplifier for comparing the sensed battery voltage with the reference voltage;
    means for operating said controlling means in response to said operational amplifier, whereby said full charge circuit will be operative when the battery voltage is above a threshold; said trickle charge circuit comprising a diode and a resistor.

5. A constant current battery charging circuit, which comprises:
an input voltage source;
a trickle charge circuit coupled between said input voltage source and a battery to be charged;
a full charge circuit coupled between said input voltage source and the battery to be charged;
said full charge circuit including means for providing a constant current;
means for controlling said constant current means;
means for sensing the voltage of the battery;
means for providing a reference voltage;
an operational amplifier for comparing the sensed battery voltage with the reference voltage;
means for operating said controlling means in response to said operational amplifier, whereby said full charge circuit will be inoperative and said trickle charge circuit will be operative when the battery voltage is above a threshold; said constant current providing means comprising a three-terminal adjustable voltage regulator with a resistor at its output.

6. A circuit as described in claim 5, said controlling means comprising a first switch interposed between the adjustment terminal of the three-terminal adjustable regulator and the output of said resistor.

7. A circuit as described in claim 6, including an LED coupled to said first switch for indicating whether full charge or trickle charge is occurring.

8. A circuit as described in claim 6, said first switch comprising a photo-FET that is responsive to said operating means.

9. A circuit as described in claim 8, said operating means comprising a second switch coupled to the output of said operational amplifier, with the output of said second switch being coupled to said controlling means.

10. A circuit as described in claim 9, said second switch comprising an FET.

11. A constant current battery charging circuit, which comprises:
an input voltage source;
a trickle charge circuit coupled between said input voltage source and a battery to be charged;
a full charge circuit coupled between said input voltage source and the battery to be charged;
said full charge circuit including means for providing a constant current;
means for controlling said constant current means;
means for sensing the voltage of the battery;
means for providing a reference voltage;
an operational amplifier for comparing the sensed battery voltage with the reference voltage;
means for operating said controllng means in response to said operational amplifier, whereby said full charge circuit will be inoperative and said trickle charge circuit will be operative when the battery voltage is above a threshold; said operating means comprising a second switch coupled to the output of said operational amplifier, with the output of said second switch being coupled to said controlling means.

12. A circuit as described in claim 11, said second switch comprising an FET.

13. A circuit as described in claim 11, said battery voltage sensing means comprising a voltage divider coupled to an input terminal of said operational amplifier; said reference voltage providing means being coupled to the other input terminal of said operational amplifier.

14. A circuit as described in claim 13, including a diode having a negative temperature coefficient coupled to said reference voltage providing means whereby the reference voltage will decrease in response to increasing temperature.

15. A constant current battery charging circuit which comprises:
an input voltage source;
a trickle charge circuit coupled between said input voltage source and a battery to be charged;
a full charge circuit coupled between said input voltage source and the battery to be charged;
said full charge circuit including means for providing a constant current, said constant current providing means comprising a three terminal adjustable voltage regulator with a resistor at its output;
means for controlling said constant current means, said controlling means comprising a first switch interposed between the adjustable voltage terminal of the three terminal adjustable regulator and the output of said resistor;
means for sensing the voltage of the battery;
means for providing a reference voltage;
temperature compensation means for varying the reference voltage in response to temperature variations;
means for comparing the sensed battery voltage with the reference voltage, said comparing means comprising an operational amplifier;
means for operating said controlling means in response to said comparing means, whereby said full charge circuit will be inoperative and said trickle charge circuit will be operative when the battery voltage is above a threshold;
said comparing means including means for providing hysteresis for preventing rapid on/off operation of said operating means around the threshold;
said comparing means comprising an operational amplifier and said operating means comprising a second switch coupled to the output of said operational amplifier, with the output of said second switch being coupled to said controlling means;
said battery voltage sensing means comprising a voltage divider coupled to an input terminal of said operational amplifier; said reference voltage providing means being coupled to the other input terminal of said operational amplifier; and
said temperature compensation means comprising a diode having a negative temperature coefficient coupled to said reference voltage providing means whereby the reference voltage will decrease in response to increasing temperature.

16. A constant current battery charging circuit, which comprises:
an input voltage source;
a trickle charge circuit coupled between said input voltage source and a battery to be charged;
a full charge circuit coupled between said input voltage source and the battery to be charged
said full charge circuit including means for providing a constant current;
means for controlling said constant current means;
means for sensing the voltage of the battery;
means for providing a reference voltage;
an operational amplifier for comparing the sensed battery voltage with the reference voltage;

means for operating said controlling means in response to said operational amplifier, whereby said full charge circuit will be inoperative and said trickle charge circuit will be operative when the battery voltage is above a threshold; said reference voltage providing means comprising a three-terminal adjustable voltage regulator, a constant current line including a line having a fixed resistance coupled to the adjustable voltage terminal of said three-terminal adjustable voltage regulator, and means for providing an amplified voltage to said comparing means.

17. A battery charging circuit which comprises:
an input voltage source;
a charging circuit coupled between said input voltage source and a battery to be charged;
means for controlling said charging circuit;
means for sensing the voltage of the battery;
means for providing a reference voltage;
an operational amplifier for comparing the sensed battery voltage with the reference voltage;
means for operating said controlling means in response to said comparing means;
temperature compensation means for varying the reference voltage in response to temperature variations, said temperature compensation means including a diode having a negative temperature coefficient coupled to said reference voltage providing means, whereby the reference voltage will decrease in response to increasing temperature.

18. A circuit as described in claim 17 having means for testing the battery condition including a separate test circuit comprising means for providing a reference voltage, means for sensing the battery voltage, means for comparing the sensed battery voltage with the reference voltage, and means for indicating a selected battery condition in response to said last-mentioned comparing means.

19. A circuit as described in claim 18, including means coupling said test circuit to said operational amplifier, whereby during testing said comparing means perceives that the battery voltage is above the threshold.

20. A circuit as described in claim 17, said operating means comprising a second switch coupled to the output of said operational amplifier, with the output of said second switch being coupled to said controlling means.

21. A circuit as described in claim 20, said second switch comprising an FET.

22. A circuit as described in claim 17, including a separate testing circuit which comprises a test selector switch for coupling the battery to the testing circuit, means for providing a reference voltage, means for sensing the battery voltage, means for comparing the sensed battery voltage with the reference volage, means for providing a constant current sink across the battery, means for providing a signal to discontinue significant charging of the battery, and means for indicating a selected battery condition in response to said comparing means.

23. A testing circuit for a battery charger, which comprises:
a test selector switch for coupling the battery to the testing circuit;
means for providing a reference voltage; means for sensing the battery voltage;
means for comparing the sensed battery voltage with the reference voltage;
means for providing a constant current sink across the battery;
means for providing a signal to discontinue significant charging of the battery; and
means for indicating a selected battery condition in response to said comparing means.

24. A constant current battery charging circuit, which comprises:
an input volage source;
a trickle charge circuit coupled between said input voltage source and a battery to be charged;
a full charge circuit coupled between said input voltage source and the battery to be charged;
said full charge circuit including means for providing a constant current;
means for controlling said constant current means;
means for sensing the voltage of the battery;
means for providing a reference voltage;
temperature compensation means for varying the reference voltage in response to temperature variations;
means for comparing the sensed battery voltage with the reference voltage;
means for operating said controlling means in response to said comparing means, whereby said full charge circuit will be inoperative and said trickle charge circuit will be operative when the battery voltage is above a threshold;
said comparing means including means for providing hysteresis for preventing rapid on/off operation of said operating means around the threshold, said temperature compensation means and said hysteresis providing means being independent of each other;
means for testing the battery condition including a separate test circuit having means for providing a reference voltage, means for sensing the battery voltage, means for comparing the sensed battery voltage with the reference voltage, and means for indicating a selected battery condition in response to said comparing means.

* * * * *